May 19, 1964 W. A. PATZER 3,133,641
METHOD AND APPARATUS FOR TESTING PAPER CURRENCY AND THE LIKE
Original Filed Oct. 24, 1958 5 Sheets-Sheet 1
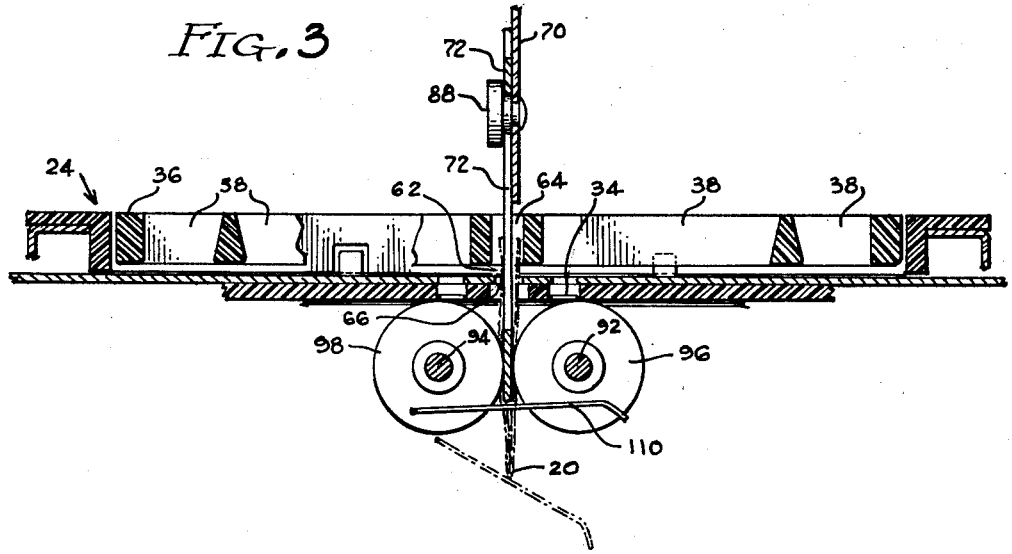
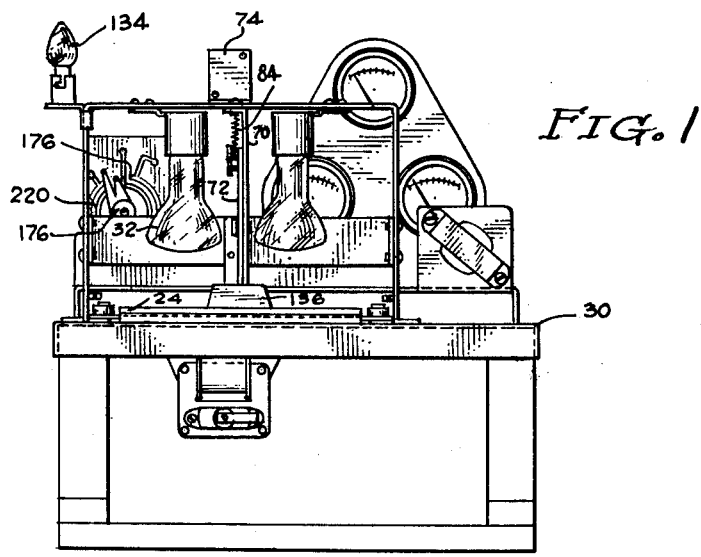
INVENTOR.
William A. Patzer
BY
Ooms, McDougall, Williams & Hersh
Attorneys May 19, 1964  W. A. PATZER  3,133,641
METHOD AND APPARATUS FOR TESTING PAPER CURRENCY AND THE LIKE
Original Filed Oct. 24, 1958  5 Sheets-Sheet 2

INVENTOR.
William A. Patzer
BY
Ooms, McDougall, Williams & Hersh
Attorneys

May 19, 1964 W. A. PATZER 3,133,641
METHOD AND APPARATUS FOR TESTING PAPER CURRENCY AND THE LIKE
Original Filed Oct. 24, 1958 5 Sheets-Sheet 4

INVENTOR.
William A. Patzer
BY
Ooms, McDougall, Williams & Hersh
Attorneys

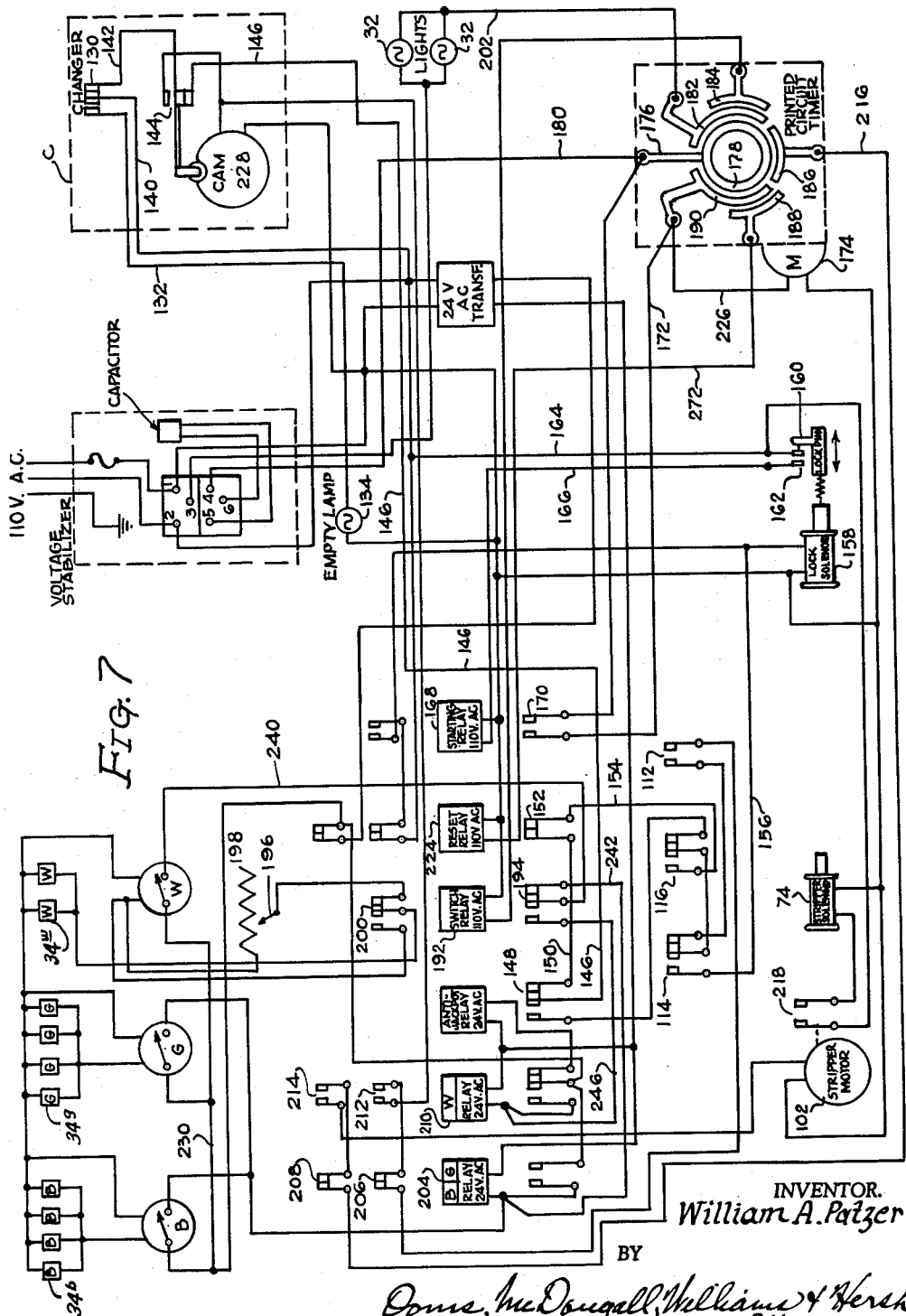

United States Patent Office 3,133,641
Patented May 19, 1964

3,133,641
METHOD AND APPARATUS FOR TESTING PAPER CURRENCY AND THE LIKE
William A. Patzer, Chicago, Ill., assignor, by mesne assignments, to Automatic Canteen Company of America, Chicago, Ill., a corporation of Delaware
Continuation of application Ser. No. 769,403, Oct. 24, 1958. This application Oct. 10, 1960, Ser. No. 63,235
4 Claims. (Cl. 209—111.5)

This invention relates to a testing device for the selection and/or rejection of imprinted material or other material having configurations printed or otherwise incorporated in or on the material and through which light is capable of transmission in an amount depending upon the character of the configurations or imprint and in an amount depending upon the characteristics of the material itself.

This is a continuation of application Ser. No. 769,403, filed October 24, 1958, entitled "Test Device and Means" (now abandoned), which was a continuation-in-part of applications Ser. No. 676,527 (now abandoned), and Ser. No. 744,966, now U.S. Patent No. 3,108,693, issued on October 29, 1963.

In general, this invention is addressed to a device by which imprinted material can be separated one from the other in accordance with the imprint or configurations thereon and wherein selected materials can be accepted while others are rejected, as in the selection of currency of one denomination as distinguished from another or in the selection of legitimate currency with the rejection of counterfeits. A device of the type described can be used for various purposes such as in the selection or separation of checks, stubs, tickets, money and the like.

It is an object of this invention to provide a new and simple means for testing by light transmission to effect the selection or separation of imprinted materials wherein the material itself is capable of some amount of light transmission.

It is a further object to produce a testing device of the type described which is simple in construction, easy in operation, and which is effective to effect separations based not only upon the amount of light transmission through the imprinted portions of the material but which is effective also to enable testing and/or separation in response to the amount of light transmission through unprinted portions of the material.

These and other objects and advantages of this invention will hereinafter appear and for purposes of illustration, but not of limitation, an embodiment of the invention is shown in the accompanying drawings in which—

FIG. 1 is a front elevational view of the device embodying the features of this invention;

FIG. 3 is a sectional elevational view along the line 3—3 of FIG. 2;

FIG. 7 is an electrical diagram of the device shown in the previous figures.

The description of the invention will be made with reference to the use of the device for testing of currency to provide for the acceptance of paper currency of a desired denomination and the rejection of all other papers introduced for test into the machine. It will be understood that the reference to currency will be only as representative of the various imprinted, light transmissible paper or sheet stock which may be processed through the machine to effect separation in accordance with various configurations embodied therein or thereon or to effect acceptance of certain material and the rejection of others, as previously described.

Having briefly outlined the scope of the invention, reference will now be made to its construction and operation. The test section, constituting the principal features of this invention, relies upon the transmission of light through the paper or currency in determination of the character of the material and the arrangement or imprint of configurations embodied therein or imprinted thereon. By the direction of rays from a source onto one side of the paper or currency and by the arrangement of suitable responsive cells adjacent the opposite side of the currency, use can be made of the cells to measure the amount of rays transmitted through various selected sections of the currency and means are employed in combination with the cells to control certain operations as a result of their energization or lack of energization. By arrangement of the responsive cells so that predetermined cells underlie portions of the currency known to have low light transmission, it is possible to effect selection and separation of such papers or currency. A pattern can be established which can be met only by currency of a predetermined denomination as distinguished from other currency or paper. Similarly, a pattern can be established for use with papers having certain groups of letters or figures, such as checks, tickets, stubs, paper, plastic or the like, as long as the base material has some degree of light transmission.

Figure 2:
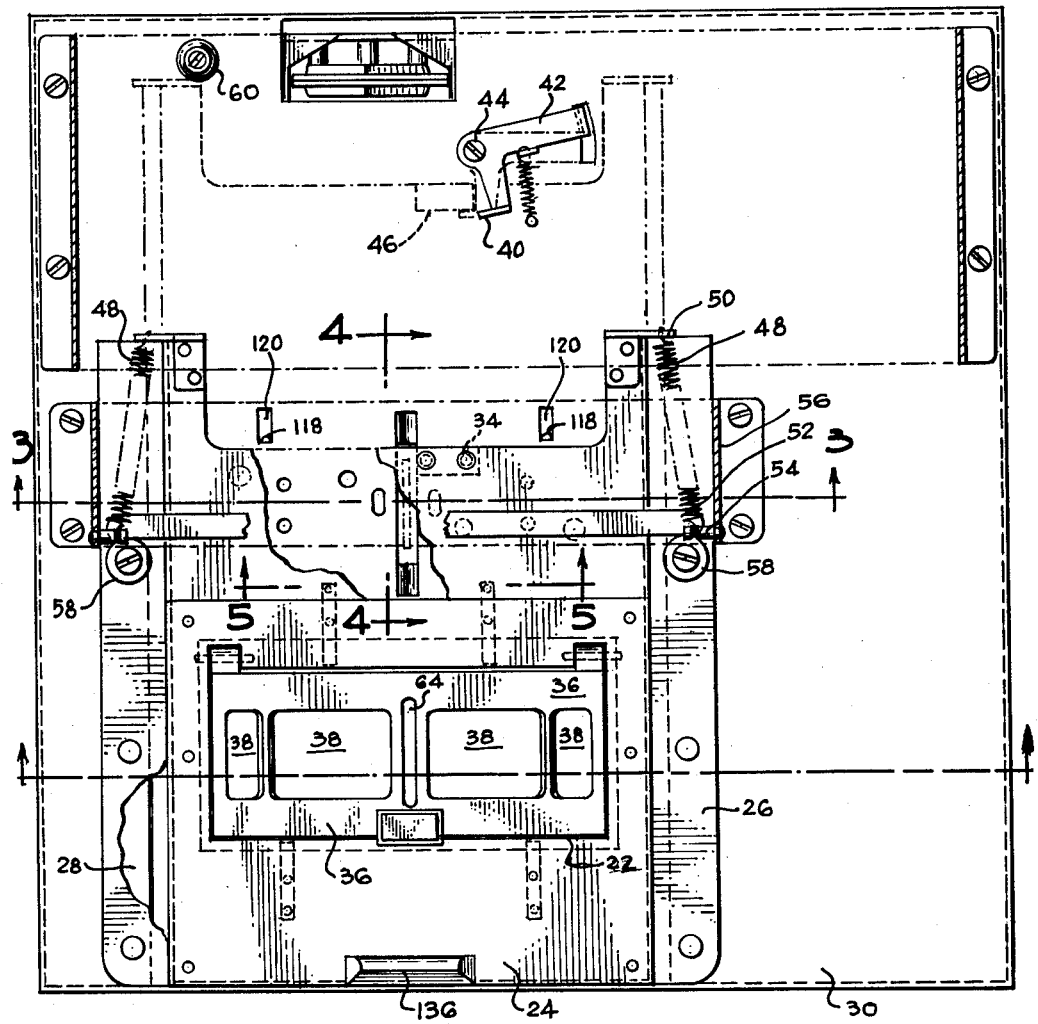
FIG. 2 is a top plan view of the test portion of the device shown in FIG. 1 with parts broken away for better illustration of the interior portions thereof.

As described in the aforementioned copending applications, the paper or currency 20 to be tested is positioned within an opening 22 extending crosswise of a slide or drawer 24 and which is dimensioned to receive the currency in a flatwise position. The slide plate 24 is guided by the side bars 26 and 28 for endwise displacement of a flat top 30 on a table for movement between a normal retracted position, illustrated by solid lines in FIG. 2, and an operative or test position indicated by the broken lines in FIG. 2.

When in test position, the paper or currency is interposed between a light source 32 and a plurality of light responsive cells 34 positioned to underlie selected portions of the paper or currency, some of which are unprinted portions having low light transmission, wherein the cells are referred to as $34^g$ for the cells underlying the portions printed with green and $34^b$ for the cells underlying the portions printed with black ink. The cells underlying the unprinted portions having high light transmission are hereinafter referred to as $34^w$. Each of the cell groups, $34^g$, $34^b$, and $34^w$, has operatively associated therewith an individual meter relay labelled G, B, and W, respectively. These meter relays are conventional and may be of the type described in the previously cited patent.

In order for the light to strike the portions of the paper or currency overlying the light responsive cells 34, the door 36 which is rocked into and out of the currency receiving opening 22 is formed with windows 38 which are aligned endwise with the cells.

The slide plate 24 is latched in testing position, for the duration of the light test and while the acceptable currency is removed, by means of a latching finger 40 on the end of a bell crank 42 which is adapted to rock about its pivot 44 between blocking and unblocking position. When in blocking position, shown in broken lines in FIG. 2, the finger 40 is projected into the path of a block 46 rigid with the underside of the slide plate 24 to prevent return of the slide plate to normal position. When in unblocking position, shown by the solid lines in FIG. 2, the latching finger is out of the path of the block 46 to enable automatic return movements of the slide plate to starting position responsive to the actuation of spring members 48. Said spring members have one end 50 anchored to the table while the other end is anchored at 52 onto a pin 54 rigid with the wall 56 constituting a part of the framework fixed to the top of the table and extending about the test section. Bumpers 58 rigid with the table extend into the path of the slide plate to stop the latter in normal position while other bumpers 60, also rigid with the table, extend into the path of the slide plate to engage the slide plate when displaced to test position.

The slide plate and the door are provided with slots 62 and 64 respectively which extend lengthwise across the central portion of the opening in alignment with about the center of the paper or currency 20 placed in test position therein. The table top is also provided with a similar slot 66 in alignment with the slots 62 and 64 when the slide plate is displaced to test position to enable the paper or currency to be displaced from the slide plate as by means of a device, hereinafter referred to as a currency stripper, or by other suitable displacement means.

Figure 4:
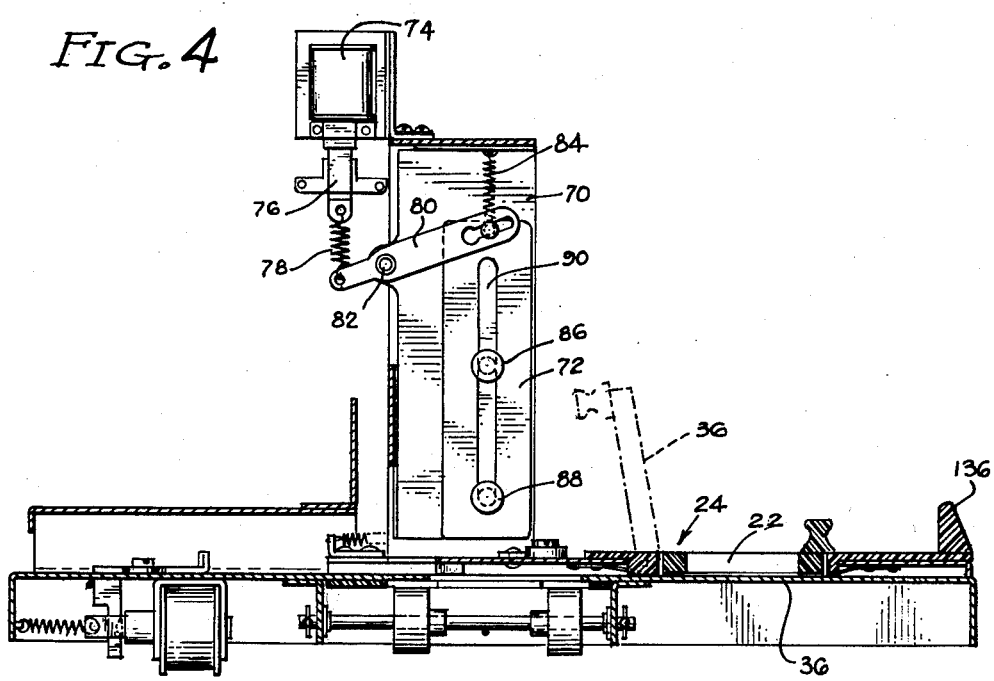
FIG. 4 is a sectional elevational view taken along the line 4—4 of FIG. 2.
Figure 5:
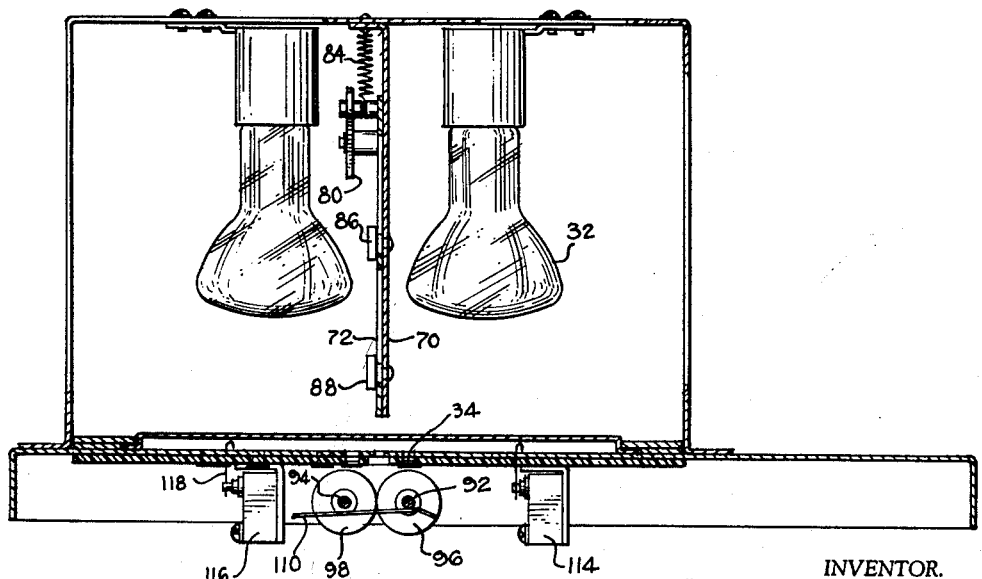
FIG. 5 is a sectional view taken across the line 5—5 of FIG. 2.

The currency stripper, in the illustrated modification, comprises a vertically disposed frame plate 70 fixed to the frame and adapted slidably to mount a currency stripper plate 72 for endwise displacement between raised or retracted position, as shown in FIG. 4, and lowered or operated position, as shown in FIG. 3. When in raised position, the lower edge of the currency stripper plate is spaced from the slide plate and, when in operated position, the currency stripper plate extends through the slide plate and the aligned slots to bring the lower edge beyond the underside of the table. The currency stripper is displaced toward operated position by a solenoid 74 which operates through rod 76 and spring 78 to urge rocking movement of the lever arm 80 about its pivot 82 to effect downward displacement of the stripper with sufficient force to overcome the restrained force of the coil spring 84. When the solenoid is inactivated to extend the rod 76, the restraining spring 84 becomes dominant to effect return movement of the stripper to normal position. The stripper plate is guided in its linear movement as by means of vertically spaced apart studs 86 and 88 rigid with the frame plate 70 and which extend through an elongate continuous slot 90 in the stripper. The studs further operate to define the movements of the stripper plate between operated and retracted positions of adjustment.

Figure 6:
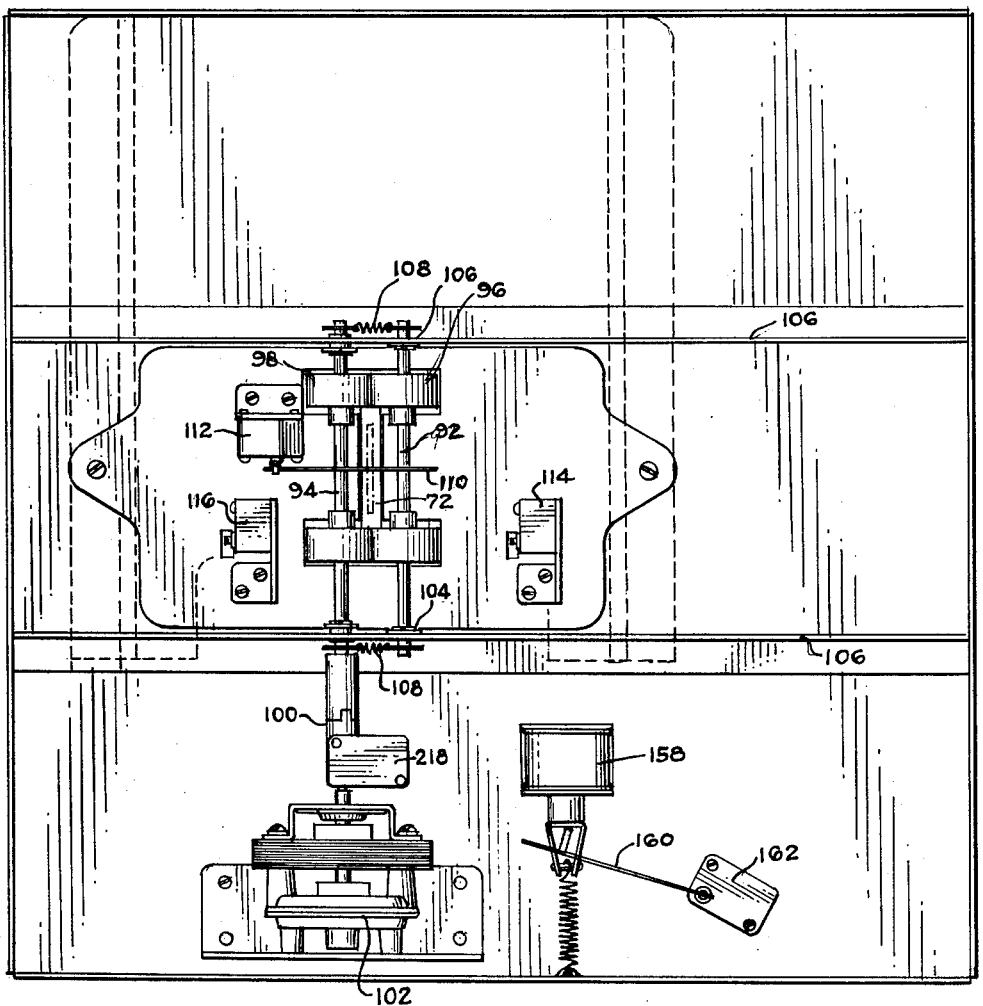
FIG. 6 is a plan view from the bottom side of the device shown in FIG. 1.

The device is provided with a means on the underside of the table to take over from the stripper plate and complete displacement or removal of the acceptable paper or currency. As illustrated in FIGS. 3 and 6, such auxiliary displacement or removal means comprises a pair of shafts 92 and 94 provided with spaced rollers 96 and 98 in operative engagement one with the other in the spaced pairs. One of the shafts 94 is operatively connected to an aligned drive shaft 100 of electrical motor 102 while the other shaft is mounted for free rotational movement in bushings 104 slidably received within slotted openings in the side walls 106 depending from the table to enable movement of the one shaft 92 in the direction toward and away from the other. The shaft 92 is resiliently urged in the direction towards the other shaft 94 by means of coil springs 108.

The rollers 96 and 98 are spaced one from the other in each pair by a distance which is greater than the width of the stripper plate 72 but less than the width of the paper or currency 20 so that the rollers will engage the paper or currency displaced into the nip by the stripper plate without operatively engaging the plate. Thus the rollers can effect continued movement of the paper or currency while leaving the stripper plate free to move independently of the paper or currency. The drawings in FIGS. 3, 4 and 6 show one test for insuring that the paper or currency has been delivered from the slide plate by the stripper plate. This test comprises a switch arm 110 connected to the switch member 112 and extending into the path of the movement of the paper or currency upon delivery from the drawer by the stripper plate and rollers. The switch arm 110 is displaced by the paper or currency to make the switch 112 as the rollers take over to effect further delivery movements. The switch 112 must be made before subsequent operations can be effected, as illustrated by the delivery of proper change for the currency of the selected denomination as by means of the mechanism illustrated by the letter "C" in FIG. 7 of the drawings.

One other test not previously described insures the presence of a paper or currency of the proper dimension before the light transmission test is carried out or before the slide plate is locked in test position. This test comprises two or more switch members 114 and 116 fixed to the underside of the table in laterally spaced apart relation with switch arms 118 extending upwardly through openings 120 in the table to be engaged by the leading edge of the paper or currency 20 as it is displaced into its final position for testing. The switch arms 118 are spaced to be engaged by laterally spaced apart portions of the leading edge of the paper or currency and preferably to include at least the outer edge portions on each side of the paper or currency. If the switches are made and remain made during the test operations, the subsequent locking step and test can be carried out. If the switches 114 and 116 are not made, the slide plate does not become latched in test position and the springs 48 are effective immediately to return the slide plate with the paper still in the opening.

Having described the structural elements, description will now be made in greater detail of the operation of the device as employed in combination with a unit for giving change for a dollar bill. Obviously other devices can be operated, if desired, in response to the acceptance of the currency from the test unit.

In the following description of the operation of the machine, it will be assumed that the coin tubes are properly filled with coins so that the switch 130 will be made so that no current will travel through the line 132 to the empty lamp 134 for indicating when one or more of the tubes are empty. Starting with the slide plate 24 in retracted position, as shown by solid lines in FIG. 2, the door 36 can be rocked about its pivot to raised position, as shown by the broken lines in FIG. 4. This permits access to the opening adapted to receive the paper or currency 20. After insertion of the dollar bill, the door is rocked about its pivot to lowered position into the opening to hold down the dollar bill in the pocket of the slide plate.

The slide plate can be displaced forwardly as by means of the knob 136 to test position with the dollar bill properly located between the light source 32 and the light cells 34. If the paper placed in the opening of the slide plate has a dimension corresponding to a legitimate dollar bill and if it is laid flatwise in the pocket, the leading edge 122 of the dollar bill will engage the switch arms 118 of the switches 114 and 116 to make the switches during final movement of the dollar bill to test position. This will enable current to flow through line 140 through the switch 130 into line 142 and through the switch 144 to line 146. From line 146 the curent flows through the switch contacts of anti-jackpot relay 148 into line 150 and through the reset relay switch 152 into line 154 and through the made switches 116 and 114 into the line 156 to the lock solenoid 158 which is operative to rock the latching lever 42 to latching position while simultaneously actuating the switch arm 160 to make the switch 162. This places the latching finger 40 into position to confront the block 46 to hold the slide plate in test position.

Responsive to the displacement of the latching lever to latching position, the switch 162 is made, as described, to enable current to flow from the outlet in line 164 to line 166 to the starting relay 168. The starting relay makes the switch 170 to enable current to flow through line 172 to the timing motor 174. The timing motor actuates a rotor 176 having one contact in engagement with the center strip 178 connected to the inlet through line 180 while the other contact sequentially engages a light strip 182, a switch relay strip 184, a stripper strip 186, a reset strip 188, and a motor strip 190 before return to starting position.

It will be apparent that if less than all of the switch fingers 118 are engaged to make the switches 114 and 116, current will be incapable of flow as described to the lock solenoid 158. As a result, the latching lever 42 will not be rocked to latching position so that the slide plate will be free for immediate return by the springs 48 with the paper still retained in the pocket.

If the bill has properly made the switches 114 and 116 and the latching means has been operated, the motor driven rotor then takes over for controlling the subsequent operations of the device. Assuming, for the moment, as in the previous systems described in the aforementioned copending applications, that the switch relay 192 is operative to make the switch 194 thereby to short-circuit the potentiometer 196 and its associated resistance coil 198 and switch 200, as the rotor is turned to bring the arm into engagement with the light strip 182, current will flow through line 202 to the lamps 32 to cause their illumination. If the areas of the dollar bill overlying the cells $34^b$ and $34^g$ are effective to prevent light transmission in an amount sufficient to activate the relay 204 the switches 206 and 208 remain closed. If the areas of the dollar bill overlying the cells $34^w$ permit transmission of light in the amount to activate the relay 210, the switches 212 and 214 will be made. Then, upon contact of the rotor with the stripper strip 186, current will be able to flow through the lines 216, through the switch 208 and through the switch 214 to the stripper motor 102 to effect turning movement of the shafts 92 and 94 on which the rollers 96 and 98 are mounted.

Responsive to operation of the stripper motor 102, the stripper switch 218 is made, as by displacement of the drive shaft 100, for passage of current to the stripper solenoid 74. This effects retraction of the rod 76 with concurrent displacement of the stripper plate 72 to its operated position. As the stripper is displaced from its retracted position to operated position through the aligned slots 62, 64 and 66, it engages the central portion of the dollar bill 20 whereby the bill is folded and carried with the stripper through the slot 66 and into the nip of the underlying pair of rollers 96 and 98. As the edges of the dollar bill are brought into engagement with the rollers, the rollers take over from the stripper to continue displacement of the folded bill for delivery into a suitable receiver. As the folded bill is carried by the rollers beyond the stripper, the leading edge engages the switch arm 110 to effect displacement thereof whereby the switch 112 is made.

It will be apparent that the black cells and the green cells $34^b$ and $34^g$ are each connected in parallel so that if any one becomes energized by the transmission of light in excess of the amount calculated, then the relay 204 will be operated to open the switches 206 and 208. Under such circumstances, indicating failure of the paper to meet the test for acceptability, the paper will remain in the slide plate for return with the slide plate to starting position outside of a housing enclosing the test section.

Whether or not the paper or dollar bill is acceptable, continued movement of the motor driven rotor on the printed circuit 220 will bring the rotor into contact with the reset strip 188 to enable current to flow through line 272 to the reset relay 224 which operates through lines connected therewith to reset the solenoid 74 and 158 and the various switches thereby to inactivate the lock solenoid and release the slide plate for return to normal position. It will be apparent that upon operation of the reset relay 224, current will be incapable of flow by the usual path to the driving motor 174. In order to continue operation of the rotor to complete the cycle of the printed circuit, use is made of the motor strip 190 to transmit current directly to the timing motor 174 through line 226. Thus the motor 174 will continue to operate until the rotor is returned to starting position.

In order for the change or other dispensing motor 228 to operate, current will have to flow through the switch 112 which is made in response to the displacement of the bill from the slide plate. In order for current to flow to switch 112, it will be necessary for current to flow through the switch members 114 and 116 and it is capable only of flow therethrough to the switch 112 when the switches are unmade in response to the release of the switch arms 118 upon removal of the dollar bill from the slide plate. Thus the dollar bill will have to be removed from the slide plate and displaced to make the switch 112 for flow of current to the motor 228 and the switches 206, 208, 212 and 214 will also have to remain made in the line.

The foregoing is a brief description of the device and its operation as defined in the foregoing copending applications. The improvement embodying the concepts of this invention resides in the modification of the light transmission test whereby the test is made more critical from the standpoint of separating paper or currency in accordance with the amount of light capable of transmission through the areas of high light transmission. It has been found that duplication may be possible as between areas of high light transmission and low light transmission such that one would be able to produce a counterfeit that would be capable of maintaining the light transmission test. However, such counterfeiting is made extremely more difficult when acceptance can be made dependent upon the amount of light transmission through the areas of high light transmission thereby to incorporate a light transmission analysis of the paper or other material upon which the imprints are formed.

For this purpose, modification is made in the wiring diagram and construction as illustrated in FIG. 7 of the drawings. Added to the construction and assembly is a resistor 198 and potentiometer 196 and an additional circuit including a slave relay 192 controlled by the contact strip 184 of the printed circuit and connected at one of the contacts of switch 194 to the relay 204 for controlling the contact switches 206 and 208.

In operation, the potentiometer 196 is set to effect closure of the contacts of relay W at a predetermined maximum current generated by the white cells $34^w$ underlying selected areas of the paper or currency having high light transmission. When the rotor of the printed circuit contacts the light strip 182 and the lights 32 are energized, the current generated by the cells $34^w$ travels through the circuit including the potentiometer. If the current is in excess of that for which the resistor and potentiometer are set, then the closed contacts of relay w causes current to travel from line 230 to line 240 and through the contact switch 194 into line 242. Line 242 leads to the relay 204 to cause the relay to open the contacts 206 and 208 with the result that the device will operate as though excess light had been transmitted through one or more of the areas overlying the black or green cells $34^b$ or $34^g$ leading to failure of the paper or currency to meet the test with the resulting operation as previously described. If the amount of light transmitted through to the white cells is incapable of exceeding the maximum for current generation, then the relay 204 is unaffected and, from the standpoint of the amount of light transmitted through the areas capable of high light transmission, the initial test is indicative of the availability of the paper or currency to meet the test.

Now, as the rotor continues about the printed circuit and comes into contact with the relay strip 184, the current travels through the line 244 to the switch relay 192 to break the contact 194 and the switch 200 whereby the resistor and potentiometer are disconnected from the circuit and the white cells are no longer capable of effecting operation of the relay 204. Under such circumstances, the test reverts to the original condition, as earlier described, to determine if the amount of light transmission through the paper or currency is sufficient. The current from the cells 34ʷ bypasses the resistor and potentiometer. If sufficient current is generated by the cells to close the contacts of relay w, the current in line 230 travels through the line 240 through the switch 194 into the line 246 leading into the relay 210 whereby the switches 212 and 214 are made if the amount of light transmission is sufficient.

The addition of the circuit which includes the potentiometer and resistor comprises the additional test which is operative for the length of time that the rotor travels from contact with the light strip 182 to the relay strip 184 to make use of the white cells 34ʷ for testing to see that the amount of light transmission is not excessive and which, through switch-over to make use of the same unit, operates to determine whether sufficient amount of light is transmitted through the paper or currency.

This combination of additional light transmission tests now brings the paper or material as an element of the test to determine whether a support having the proper light transmission characteristics has been used.

It will be apparent that the described test device and means may be employed for various purposes other than in testing and selecting currency or in the operation of a change-making device and it will be further understood that all or part of these tests may be employed separately or in combination to effect a desirable test of a material capable of some degree of light transmission.

It will be understood that numerous changes may be made in the details of construction, arrangement and operation without departing from the spirit of the invention, especially as defined in the following claims.

I claim:

1. A device for testing to determine the acceptability of a sheet material capable of transmission of radiations, portions of which are capable of high transmission while others are capable only of low transmission, including a means for introducing the material to a test position, a source of radiations on one side of the material when in test position, a plurality of radiation responsive cells on the opposite side of the material in test position some of which are positioned to underlie areas of the material calculated to be capable of high transmission and others of which are in position to underlie areas of the material calculated to be capable of low transmission, an electrical circuit having switch means therein some of which are open and some of which are closed, means controlling the closed switch means through the response of the cells underlying areas having low transmission whereby the closed switch means are opened to interrupt the circuit in the event of transmission of excessive radiations to said last mentioned cells, means controlling the open switch means through the response of the cells underlying the areas calculated to have high transmission whereby the open switch means are closed in response to the transmission of sufficient radiations through the material to the cells, the improvement which comprises means for initially connecting the cells underlying the areas calculated to have high transmission with the closed switch means, means for setting the current from the cells whereby the closed switch means are opened in response to the transmission of excessive radiations through the material to the cells, and means for subsequently short-circuiting said latter means for reconnecting the cells with the open switch means for closing the open switch means in response to the transmission of sufficient radiations through the material to the cells.

2. A device for determining the acceptability of sheet material capable of light transmission, portions of which are capable of high light transmission while others are capable only of low light transmission and including a means for introducing a material to a test position, a light source on one side of the material in test position, a plurality of light responsive cells on the opposite side of the material in test position, some of which are positioned to underlie areas of the material calculated to be capable of high light transmission, others of which are positioned to underlie areas of the material calculated to be capable of low light transmission, an electrical circuit embodying switch means therein some of which are open and some of which are closed, means normally controlling the closed switch means through the response of cells underlying the areas having low light transmission whereby the closed switch means are opened to interrupt the circuit in response to the transmission of excessive light through the material to said last mentioned cells and means controlling the open switch means through the response of the cells underlying the areas calculated to have high light transmission whereby the open switch means are closed in response to the transmission of sufficient light through the material to the cells, the improvement which comprises means operative initially to connect the cells underlying the areas calculated to have high light transmission with the closed switch means, and means for setting the current from the cells whereby the closed switch means are opened in response to the transmission of excessive light through the material to the cells.

3. A device for testing to determine the acceptability of a sheet material capable of transmission of radiations, portions of which are capable of high transmission and others of which are capable only of low transmission comprising a means for introducing the material to a test position, a source of radiations on one side of the material when in test position, a plurality of radiation responsive cells on the opposite side of the material in test position some of which are positioned to underlie areas of the material calculated to be capable of high transmission and others of which are in position to underlie areas of the material calculated to be capable of low transmission, an electrical circuit having switch means therein some of which are open and some of which are closed, means controlling the closed switch means through the response of the cells underlying areas having low transmission whereby the closed switch means are opened to interrupt the circuit in the event of transmission of excessive radiations to said last-mentioned cells, means controlling the open switch means through the response of the cells underlying the areas calculated to have high transmission whereby the open switch means are closed in response to the transmission of sufficient radiations through the material to the cells, means for initially connecting the cells underlying the areas calculated to have high transmission with the closed switch means, means for setting the current from the cells whereby the closed switch means are opened in response to the transmission of excessive radiations through the material to the cells, and means for subsequently short-circuiting said latter means for reconnecting the cells with the open switch means for closing the open switch means in response to the transmission of sufficient radiations through the material to the cells.

4. A device for determining the acceptability of sheet material of light transmission, portions of which are capable of high light transmission while others are capable only of low light transmission, comprising a means for introducing a material to a test position, a light source on one side of the material in test position, a plurality of light responsive cells on the opposite side of the material in test position, some of which are positioned to underlie areas of the material calculated to be capable of high light transmission, others of which are positioned to underlie areas of the material calculated to be capable of low light transmission, an electrical circuit embodying switch means therein some of which are open and some of which are closed, means normally controlling the closed switch means through the response of cells underlying the areas having low light transmission whereby the closed switch means are opened to interrupt the circuit in response to the transmission of excessive light through the material to said last mentioned cells and means controlling the open switch means through the response of the cells underlying the areas calculated to have high light transmission whereby the open switch means are closed in response to the transmission of sufficient light through the materials to the cells, means operative initially to connect the cells underlying the areas calculated to have high light transmission with the closed switch means, and means for setting the current from the cells whereby the closed switch means are opened in response to the transmission of excessive light through the material to the cells.

References Cited in the file of this patent
UNITED STATES PATENTS

| | | |
|---|---|---|
| 2,922,893 | Ett | Jan. 26, 1960 |
| 2,941,187 | Simjian | June 14, 1960 |